US011093844B2

(12) United States Patent
Paugh et al.

(10) Patent No.: US 11,093,844 B2
(45) Date of Patent: *Aug. 17, 2021

(54) DISTINGUISHING HUMAN-DRIVEN DNS QUERIES FROM MACHINE-TO-MACHINE DNS QUERIES

(71) Applicant: Nominum, Inc., Cambridge, MA (US)

(72) Inventors: James Paugh, San Carlos, CA (US); Paul O'Leary, San Francisco, CA (US); Robert S. Wilbourn, Palo Alto, CA (US); Thanh Nguyen, Newark, CA (US); Iurii Iuzifovich, Los Gatos, CA (US); Erik D. Fears, San Francisco, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/197,606

(22) Filed: Nov. 21, 2018

(65) Prior Publication Data

US 2019/0164071 A1    May 30, 2019

Related U.S. Application Data

(63) Continuation of application No. 14/969,947, filed on Dec. 15, 2015, now Pat. No. 10,164,989, which is a
(Continued)

(51) Int. Cl.
*G06F 11/30* (2006.01)
*G06F 15/16* (2006.01)
(Continued)

(52) U.S. Cl.
CPC .......... *G06N 5/046* (2013.01); *H04L 61/1511* (2013.01); *H04L 63/1441* (2013.01);
(Continued)

(58) Field of Classification Search
USPC ....... 709/203, 242, 224, 220, 217, 238, 225, 709/223, 228
See application file for complete search history.

(56) References Cited

U.S. PATENT DOCUMENTS 7,472,201 B1 * 12/2008 Aitken .............. H04L 29/12066
709/245
8,090,679 B2    1/2012 Zhuge et al.
(Continued)

OTHER PUBLICATIONS

Pujol, E. et al., "Back-office web traffic on the internet.", In Proceedings of the 2014 Conference on Internet Measurement Conference (2014), ACM, pp. 257-270.
(Continued)

*Primary Examiner* — Jude Jean Gilles

(57) ABSTRACT

The present disclosure is related to a computer-implemented method and system for distinguishing human-driven Doman Name System (DNS) queries from Machine-to-Machine (M2M) DNS queries. The method includes receiving a DNS query, which includes a domain name, generating a probability score for the domain name based on one or more predetermined rules, and categorizing the DNS query as a human-driven DNS query or a M2M DNS query based on the probability score.

8 Claims, 3 Drawing Sheets

Related U.S. Application Data continuation-in-part of application No. 13/839,331, filed on Mar. 15, 2013, now Pat. No. 9,215,123.

(51) Int. Cl.
| | |
|---|---|
| *H04L 29/06* | (2006.01) |
| *H04L 9/32* | (2006.01) |
| *G06N 20/00* | (2019.01) |
| *G06N 5/04* | (2006.01) |
| *H04L 29/12* | (2006.01) |
| *H04W 4/70* | (2018.01) |
| *H04L 29/08* | (2006.01) |

(52) U.S. Cl.
CPC .............. *H04L 67/12* (2013.01); *H04W 4/70* (2018.02); *G06N 20/00* (2019.01); *H04L 2463/144* (2013.01)

(56) References Cited

U.S. PATENT DOCUMENTS

| | | | |
|---|---|---|---|
| 8,260,914 B1* | 9/2012 | Ranjan | H04L 61/1511 709/224 |
| 8,874,550 B1 | 10/2014 | Soubramanien et al. | |
| 9,124,626 B2 | 9/2015 | Chapman et al. | |
| 9,215,123 B1* | 12/2015 | Fears | H04L 67/22 |
| 9,489,529 B2* | 11/2016 | Baker | G06F 21/56 |
| 9,639,699 B1 | 5/2017 | Kurupati et al. | |
| 9,875,355 B1* | 1/2018 | Williams | G06F 21/552 |
| 9,906,544 B1 | 2/2018 | Kurupati | |
| 10,164,989 B2* | 12/2018 | Paugh | G06F 16/90335 |
| 10,742,591 B2 | 8/2020 | Nguyen et al. | |
| 2002/0194335 A1* | 12/2002 | Maynard | G06F 11/3419 709/225 |
| 2003/0115040 A1* | 6/2003 | Xing | H04L 29/12066 704/8 |
| 2006/0036598 A1 | 2/2006 | Wu et al. | |
| 2006/0218289 A1* | 9/2006 | Assad | H04L 29/12594 709/229 |
| 2007/0211714 A1* | 9/2007 | Metke | H04L 61/25 370/389 |
| 2007/0214283 A1* | 9/2007 | Metke | H04L 61/1511 709/245 |
| 2008/0086556 A1* | 4/2008 | Ramalingam | H04L 29/12066 709/224 |
| 2008/0133540 A1 | 6/2008 | Hubbard et al. | |
| 2009/0055929 A1 | 2/2009 | Lee et al. | |
| 2009/0282038 A1* | 11/2009 | Subotin | G06F 16/957 |
| 2010/0037314 A1 | 2/2010 | Perdisci et al. | |
| 2010/0125911 A1 | 5/2010 | Bhaskaran | |
| 2010/0281536 A1 | 11/2010 | Richards et al. | |
| 2011/0035469 A1* | 2/2011 | Smith | H04L 63/0227 709/220 |
| 2011/0239291 A1* | 9/2011 | Sotka | H04L 63/1408 726/14 |
| 2013/0173795 A1* | 7/2013 | McPherson | H04L 63/168 709/225 |
| 2015/0074221 A1 | 3/2015 | Kuparinen et al. | |
| 2015/0207809 A1* | 7/2015 | Macaulay | G06F 21/552 726/22 |
| 2015/0365305 A1 | 12/2015 | Namata | |
| 2020/0412687 A1* | 12/2020 | Dan | G06N 20/00 |

OTHER PUBLICATIONS

U.S. Appl. No. 14/969,947.
U.S. Appl. No. 13/839,331, now U.S. Pat. No. 9,215,123.
Letter titled Communication Under MPEP 609.02 submitted with this form, dated Nov. 21 2018.
Office Action dated Aug. 8, 2019 for U.S. Appl. No. 14/937,656, 29 pages.
Office Action dated Dec. 19, 2018 for U.S. Appl. No. 14/937,656, 28 pages.
Office Action dated Mar. 9, 2019 for U.S. Appl. No. 14/937,656, 20 pages.
Bilge, Leyla, et al., "Exposure: A Passive DNS Analysis Service to Detect and Report Malicious Domains", ACM Transactions on Information and System Security, vol. 16, No. 4, Article 14, Publication date: Apr. 2014, 28 pages. (Year: 2014).
Non-final office action for U.S. Appl. No. 14/937,656, dated Mar. 30, 2021, 24 pages.

* cited by examiner

US 11,093,844 B2

DISTINGUISHING HUMAN-DRIVEN DNS QUERIES FROM MACHINE-TO-MACHINE DNS QUERIES

CROSS-REFERENCE TO RELATED APPLICATIONS

This application is a Continuation of U.S. patent application Ser. No. 14/969,947 filed on Dec. 15, 2015 which is a Continuation-in-Part of U.S. patent application Ser. No. 13/839,331 filed on Mar. 15, 2013, entitled "DNS Requests Analysis," and issued on Dec. 15, 2015 as U.S. Pat. No. 9,215,123, the teachings of both of which are incorporated herein by reference in their entireties for all purposes.

TECHNICAL FIELD

This disclosure relates to processing Domain Name System (DNS) data. More specifically, this disclosure relates to systems and methods for distinguishing or categorizing human-driven DNS queries from Machine-to-Machine (M2M) queries.

BACKGROUND

In computer networking, domain names help identifying locations where certain information or service can be located on a public or private network. Domain names are typically formed according to rules and procedures of the DNS. Domain names can be used for various naming and addressing purposes. In general, a domain name can be resolved to an Internet Protocol (IP) resource, such as a personal computer, a server hosting website pages, or a website page or service. Thus, the DNS allows translating domain names (such as "www.example.com") into the corresponding IP address (such as "123.4.56.78") needed to establish Transmission Control Protocol/Internet Protocol (TCP/IP) communication over the Internet.

Traditionally, DNS servers resolve (i.e., translate to IP addresses) domain names upon receiving DNS queries associated with domain names. When a DNS server receives a query from a client, the DNS server checks if it can answer the DNS query authoritatively based on local information of the DNS server. If the queried domain name matches a corresponding resource record in a local cache, the DNS server can answer authoritatively. If no local record exists for the queried domain name, the DNS server can check if it can resolve the domain name using locally cached information from historical data. If a match is found, the DNS server answers based on the historical data. If the queried domain name does not find a matched answer at the DNS server level, the query can process can continue with assistance from other DNS servers.

It is common for DNS queries to be generated upon a user simply opening a web browser and making a request to open a certain website page. Those types of DNS queries are human-driven DNS queries. However, there also exist DNS queries generated by machines, hardware or software applications. For example, DNS queries can be generated upon a user opening a particular software application, such as a mobile application, and making certain requests that cause the software application address certain network resources or web services using, for example, Application Programming Interface (API) functions. In another example, one networked device, such as a first server, can address another networked device, such as a second server, using DNS queries. Thus, this second type of queries relates to M2M DNS queries.

In the Internet traffic analytics industry, it can be an important task to distinguish human-driven DNS queries from M2M DNS queries. For example, determining human behavior when they search or browse information on the Internet can be relevant for content delivery, advertisement, and security purposes. On the other hand, analyzing M2M DNS queries without human-driven DNS queries can be helpful in detecting malicious activities. Thus, methods and systems for distinguishing human-driven DNS queries from M2M DNS queries are needed.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is concerned with a computer-implemented method and system for distinguishing human-driven DNS queries from M2M DNS queries. In some example embodiments, the method includes receiving a DNS query, which includes a domain name, generating a probability score for the domain name based on one or more predetermined rules, and categorizing the DNS query as a human-driven DNS query or a Machine-to-Machine (M2M) DNS query based on the probability score.

The one or more predetermined rules can vary depending on the application. In some embodiments, the one or more predetermined rules include comparing the domain name to records of a DNS query dictionary, where the DNS query dictionary includes a first list of trusted domain names associated with various human-driven DNS queries and a second list of trusted domain names associated with various M2M DNS queries.

In certain other embodiments, the one or more predetermined rules include determining that the domain name is associated with a front-end domain name and not with a backend domain name. When it is determined that the domain name is associated with the front-end domain name, the method generates or updates the probability score of the DNS query to indicate a higher probability that the DNS query is a human-driven DNS query and not a M2M DNS query.

In some embodiments, the one or more predetermined rules include determining that the DNS query has a "www" prefix. When it is determined that the DNS query has the "www" prefix, the method includes generating or updating the probability score of the DNS query to indicate a higher probability that the DNS query is a human-driven DNS query and not a M2M DNS query. The method may further include determining that the DNS query having the "www" prefix does not fall into one or more predetermined exceptions. When it is determined that the DNS query having the "www" prefix relates to the one or more predetermined exceptions, the method includes generating or updating the probability score of the DNS query to indicate a higher probability that the DNS query is a M2M DNS query and not a human-driven DNS query.

In some embodiments, the one or more predetermined rules include determining that the DNS query is addressed to a Content Delivery Network (CDN). When it is determined that the DNS query is addressed to the CDN, the method includes generating or updating the probability score of the DNS query to indicate a higher probability that the DNS query is a M2M DNS query and not a human-driven DNS query. The determining that the DNS query is addressed to the CDN can include determining that DNS query includes a "cdn" string.

In some embodiments, the one or more predetermined rules can include determining that the DNS query is associated with a predetermined time pattern. When it is determined that the DNS query is associated with a predetermined time pattern, the method proceeds with generating or updating the probability score of the DNS query to indicate a higher probability that the DNS query is a M2M DNS query and not a human-driven DNS query. The determining that the DNS query is associated with the predetermined time pattern may include determining that there is a plurality of historical DNS queries, which are substantially the same as the DNS query, and that the plurality of historical DNS queries and the DNS query are periodically generated within a predetermined period and according to the predetermined time pattern.

In some embodiments, the one or more predetermined rules include ranking of the domain name associated with the DNS query. The ranking of the domain name can include receiving a first rank of the domain name. The ranking of the domain name can also include calculating a second rank of the domain name, wherein the calculating of the second rank of the domain name includes obtaining multiple metric values of the domain name, wherein the metric values include a query count (QC), a client count (CC), and a network count (NC). When the multiple metric values are obtained, the method may include generating the second rank of the domain name. The second rank can include applying the following equation to the metric values: Rank=NC·CC·(1+log(QC)).

In yet further embodiments, the method comprises the steps of assigning the probability score to the DNS query, storing the DNS query with an associated probability score in a DNS query dictionary, and updating the DNS query dictionary with a plurality of additional DNS queries with associated probability scores, wherein the plurality of additional DNS queries are associated with a plurality of human-driven DNS queries and a plurality of M2M DNS queries.

In some embodiments, the method may further comprise training a machine-learning classifier based on the DNS query dictionary. The generation of the probability score for the domain name based on the one or more predetermined rules includes applying the machine-learning classifier to the DNS query. Moreover, the machine-learning classifier can be configured to (when applied to a first DNS query generated by a user during web browsing activity) generate a first probability score indicating that the first DNS query is a human-driven DNS query. The machine-learning classifier can be configured to (when applied to a second DNS query not generated by a user during a web browsing activity) generate a second probability score indicating that the second DNS query is a M2M DNS query.

Furthermore, in some embodiments, the method may comprise determining that the DNS query is associated with a malicious activity. In certain embodiments, the method further comprises excluding the DNS query associated with a malicious activity from the DNS query dictionary. The determination that the DNS query is associated with the malicious activity can include obtaining historical DNS data associated with the same DNS query, calculating a QC for the DNS query, determining that the QC is higher than a predetermined threshold value, determining that the domain name of the DNS query does not have a predetermined rank, and associating the DNS query with a malicious activity.

According to another aspect of this disclosure, there is provided a system comprising at least one processor and at least one memory storing processor-executable codes. The at least one processor is configured to implement the aforementioned method for processing DNS queries.

According to yet another aspect of this disclosure, there is provided a non-transitory processor-readable medium having instructions stored thereon. When these instructions are executed by one or more processors, they cause the one or more processors to implement the above-described method for processing DNS queries.

Additional objects, advantages, and novel features will be outlined in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF DRAWINGS

Exemplary embodiments are illustrated by way of example and not limitation in the figures of the accompanying drawings, in which like references indicate similar elements.

DETAILED DESCRIPTION OF EXAMPLARY EMBODIMENTS

Figure 1:
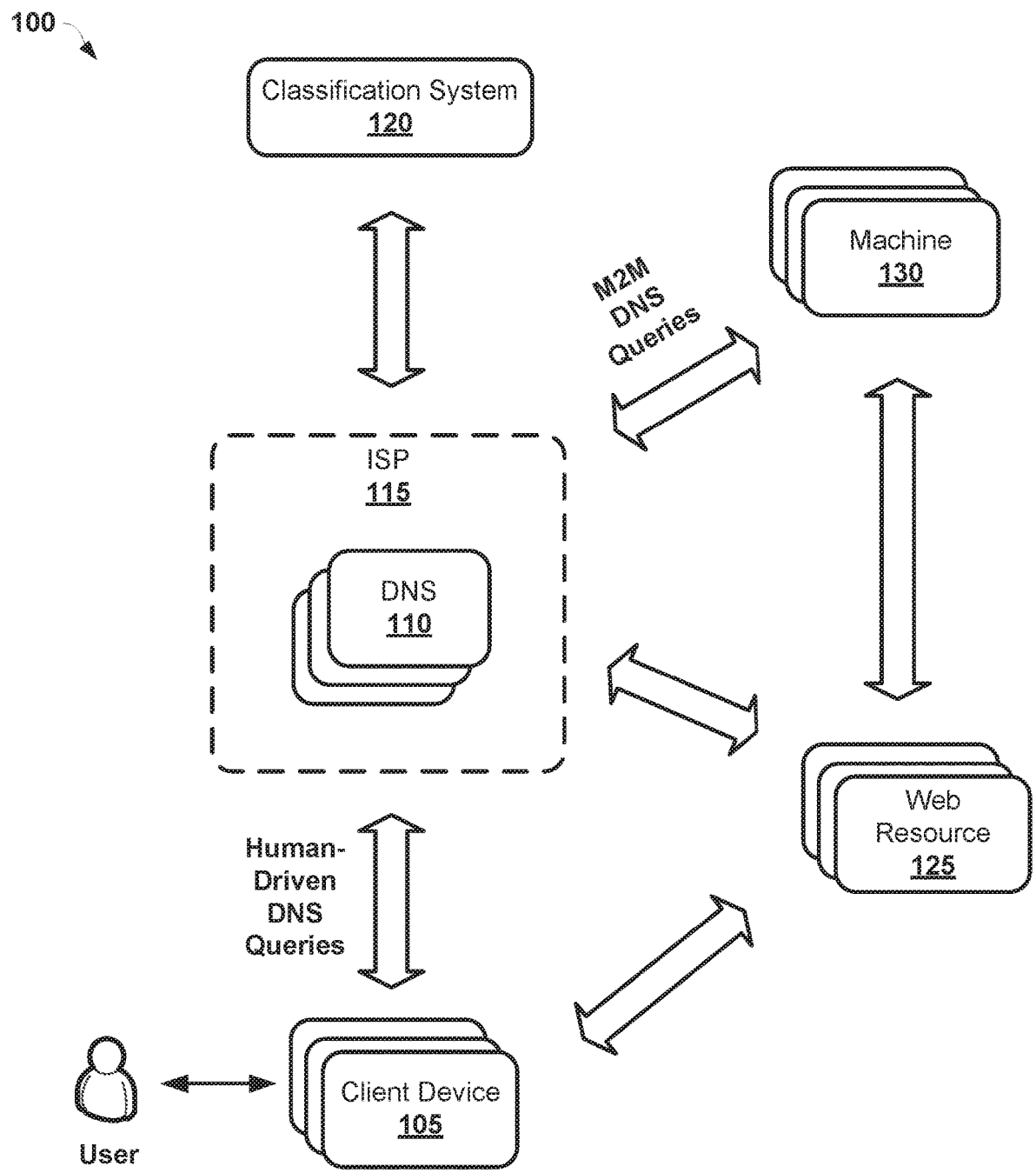
FIG. 1 is a block diagram of an example computer network environment, which is suitable for practicing the methods for distinguishing and classifying DNS queries names as described herein.

The technology disclosed herein is concerned with methods for distinguishing human-driven DNS queries from M2M DNS queries. As already outlined above, it can be relevant for Internet traffic analysis or other purposes, to distinguish and analyze only those DNS queries causation of which is proximately initiated or caused by a human and to exclude all DNS queries initiated by a machine, robot, or a software application.

For purposes of this patent document, it is important to start this disclosure with providing definitions of "human-driven DNS query" and "M2M DNS query." The term "human-driven DNS query" shall mean a DNS query initiated by immediate interactions of a human with a web browser. For example, human-driven DNS queries can be generated when a user opens a web browser, inputs a domain name, Uniform Recourse Identifier (URI), Uniform Recourse Locator (URL), or hyperlink, and causes the web browser to retrieve, address, present or display certain information associated with the input. Thus, the human-driven DNS queries encompass regular web browsing activities, such as opening website pages, social media, news reading, online shopping, blogging, watching videos over the Internet, and so forth.

The term "M2M DNS query" shall mean a DNS query initiated by a software application, middleware, or firmware, and which is initiated without immediate interaction of a human by, for example, typing a domain name or clicking on a hyperlink. In other words, M2M DNS queries are possible DNS queries excluding human-driven DNS queries. Some examples of M2M DNS queries are as follows. First, M2M DNS queries can include DNS queries generated upon a user opening a particular software application, such as a mobile application, and making certain requests that cause the software application to address certain network resources or web services using, for example, Application Programming Interface (API) functions.

Second, M2M DNS queries can include secondary DNS queries indirectly related to human-browser activity. For example, when a user initiates a DNS query to open a certain web page and a DNS server resolves it by creating secondary DNS queries addressing a Content Delivery Network (CDN) or other resources without web or human-visible content.

Third, M2M DNS queries include DNS queries produced by non-web email clients. M2M DNS queries can also include "back-end" DNS queries generated by a computer or device with a screen, from a background process not directly related to human activity. For example, the background process can relate to software updates, operating system updates, virus signature updates, cloud backup, clock synchronization, and so forth. In some embodiments, M2M DNS queries can include DNS queries produced by malware attempting, for example, to: (a) connect to command-and-control centers to download instructions; or (b) perform malicious activity targeting other legitimate websites (including DDoS attacks, ad clicking, and so forth).

In some other embodiments, M2M DNS queries can include DNS queries produced by mobile devices, including Operating System (OS) DNS queries, web browser DNS queries, and DNS queries produced by mobile applications, as well as by the malware residing on mobile devices. In yet further embodiments, M2M DNS queries can include DNS queries originated by Internet-of-Things (TOT) devices or Internet-of-Everything (IOE) devices, including, for example, sensors, appliances, cameras, television systems, thermostats, refrigerators, and the like. Moreover, in some embodiments, M2M DNS queries can include DNS queries produced by malware residing at IOT or IOE devices. M2M DNS queries can also include DNS queries produced by networking equipment, such as modems or routers.

Accordingly, the present technology allows for distinguishing or categorizing the above-defined human-driven DNS queries and M2M DNS queries. In some advanced implementations, the technology can also be configured to distinguish or categorize various types of M2M DNS queries, which are also outlined above.

The present methods use a probabilistic approach focused on classifying domain names as either most likely to be originated by a human or a non-human. Particularly, these methods include identifying DNS queries that have a high probability of being driven directly by a human activity and to distinguish these DNS queries from "back-end" or M2M traffic, which is driven by automated processes without immediate human interaction. Thus, the present methods for distinguishing human-driven DNS queries from M2M DNS queries can be used to identify when a specific subscriber household has an active human presence in front of a browser screen. In some embodiments, the methods can also aid in managing advertisement campaigns. In some embodiments, the methods can be used for reporting (e.g., to Internet Service Providers (ISPs)) to show relative popularity of various types of human activities (e.g., website browsing, mobile application usage, video streaming, audio streaming, and so forth). Yet in some other embodiments, the methods can be used for reporting (e.g., reporting to subscribers) for purposes of parental control, where parents can know what websites and applications their children spend most of time and how much time they spent online.

The present methods for distinguishing a human-driven DNS queries from M2M DNS queries do not simply analyze domain names because this process alone does not yield a definitive classification. Moreover, the probabilistic approach used herein can be helpful since websites have started migrating to a rich client/RESTful server-side model, where a hosting server has the same interface for a website and mobile applications.

Overall, the methods for distinguishing a human-driven DNS queries from M2M DNS queries involve receiving a DNS query, which includes a domain name, generating a probability score for the domain name based on one or more predetermined rules, and categorizing the DNS query as a human-driven DNS query or a M2M DNS query based on the probability score. The predetermined rules can be based on various approaches. First, the predetermined rules can compare the DNS query to a DNS query dictionary with already categorized historical DNS queries. In other words, the method can determine whether a new (target) DNS query is already listed in the dictionary and categorized as a human-driven DNS query or a M2M DNS query. Second, the predetermined rules may cause determining if the new DNS query includes a "www" prefix for a subdomain or directed to a core domain. If such a "www" prefix is present, it is most likely that the DNS query is caused by a human. There are a few notable exceptions, however, which can be predetermined. Third, the predetermined rules may cause monitoring DNS data traffic directed to "front-end" domain names only by excluding "back-end" domain names. The predetermined rules can cause determining query counts and behavioral patterns, which both are associated with the DNS query and on historical DNS query data.

Moreover, the predetermined rules can be used to determine features of the DNS query. The features can be then used for training a machine-learning classifier. The classifier can later be propagated to other new DNS queries for purposes of their classification based on the trained data. In other words, the DNS query dictionary can be used for training a machine-learning classifier to assist in the further classification of DNS queries not yet listed in the DNS query dictionary. Accordingly, after a particular DNS query is classified, it can be stored in the DNS query dictionary.

For purposes of this patent document, it is important to provide definitions of certain additional terminology as used herein. The terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Furthermore, the term "DNS" shall have its ordinary meaning of Domain Name System, which represents a hierarchical distributed naming system for computers, servers, content, services, or any resource available via the Internet or a private network. The terms "domain" and "domain name" shall be given its ordinary meaning such as a network address to identify the location of a particular website page, web resource, file, content, service, computer, server, and so forth. In certain embodiments, domain names can be identified by one or more IP addresses. Each domain name can be made up of a series of character strings separated by dots. The right-most label in a domain name is known as the "top-level domain" such as ".com," ".org" and the like. Each top-level domain supports second-level domains, such as the "nominum" level in "www.nominum.com." Each second-level domain can include some third-level domains located immediately to the left of the second-level domain, e.g. the "www" level in "www.nominum.com." There can be additional level domains as well, with virtually no limitation. For example, a domain with additional domain levels could be "www.photos.nominum.com."

In this disclosure, the term "core domain name" shall mean a parent domain, which is the combination of a second-level domain and a top-level domain, e.g. "nominum.com." The term "subdomain name" shall mean one or more additional domain levels, hostnames, and the like. Further, the term "Fully Qualified Domain Name" or FQDN shall mean the complete domain name for a specific computer, server, or host. The FQDN may consist of two parts: a subdomain name (hostname) and a core domain name.

The term "query count" or QC shall mean a number of instances or a frequency of individual DNS queries associated with a particular domain name, which appear or present in a given data set (e.g., in a given DNS data fragment). The term "client count" or CC shall mean a number of instances or a frequency of individual DNS queries associated with a particular client or user, which appear or present in a given data set with respect to one or more domain names. The term "network count" or NC shall mean a number of instances or a frequency of individual DNS queries associated with a particular network, such as a local area network (LAN) or local network architecture, which appear or present in a given data set with respect to one or more domain names.

The term "score" shall mean a numerical representation of probability that a given DNS query is associated with a human-driven DNS query or a M2M DNS query. The numerical representation can be represented as a single number, vector, data array, or matrix. In some example embodiments, the numerical representation can be in the range from 0 to 1, where "1" refers to a human-driven DNS query and "0" refers to a M2M DNS query, or vice versa.

The term "web browser" shall mean a software application for retrieving, presenting, and traversing information resources from the Internet. An "information resource" shall mean a website page, file image, video, content, service, or the like, which can be identified by a domain name, IP address, URI, URL, or hyperlink.

Referring now to the drawings, various embodiments will be described, wherein like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 shows a block diagram of an example computer network environment 100 suitable for practicing the methods for distinguishing and classifying DNS queries as described herein. It should be noted, however, that the environment 100 is just one example, and simplified embodiment provided for illustrative purposes and reasonable deviations of this embodiment are possible as will be evident for those skilled in the art.

As shown in FIG. 1, there is provided a client device 105 (also referred herein to as "client" for simplicity). The client device 105 is generally any appropriate computing device having network functionalities allowing communicating under any existing IP protocols (e.g., IPv4, IPv6). For these ends, each client device 105 can be associated with an IP address. Some examples of the client devices 105 include, but are not limited to, a computer (e.g., laptop computer, tablet computer, desktop computer), server, cellular phone, smart phone, gaming console, multimedia system, smart television device, set-top box, infotainment system, in-vehicle computing device, informational kiosk, robot, smart home computer, home appliance device, IoT device, IoE device, sensor, thermostat, software application, computer operating system, modem, router, and so forth. The environment 100 may include multiple client devices 105, but not necessarily. For purposes of this patent document, the client devices 105 are used by users for Internet browsing purposes. Particularly, the users can open a web browser installed on the client device 105 and control it to reach any website pages.

The system environment also includes one or more "machines" 130. In general, the machines 130 refer to the same class of devices as the client devices 105. However, the machines 130 are not immediately used by users to browse website pages via a browser. Instead, the machines 130 are those devices that generate automatic requests to reach certain remote servers or web resources without a need to use a browser. This may include a computer sending a request to synchronize an internal clock or location, or mobile application sending a request to check for new updates. Thus, in certain instances, the client devices 105 can serve as machines 130 when no users are involved, while machines 130 can also serve as client devices 105 when users operate them for purposes of internet browsing.

When the user operates the client device 105, it can make certain client inquires to the computer network environment 100, such as a request to open, in a web browser, a website hosted by a web resource 125, download a file from the web resource 125, and so forth. A client inquiry may include a DNS query associated with a domain name (e.g., in the form of "www.nominum.com"), which requires the resolution by a DNS server into one or more corresponding IP addresses associated with the web resource 125. The DNS query initiated by the client device 105 can be transmitted to a recursive DNS server, or simply, DNS 110, which can be associated with a particular ISP 115. The ISP 115 can include a plurality of DNSs 110. For purposes of this patent document, the terms "DNS query," "DNS inquiry," and "DNS request" may mean the same and, therefore, can be used interchangeably.

The DNS 100 resolves the DNS query and returns an IP address associated with the domain name of the DNS query. The IP address can be delivered to the client device 105. In certain embodiments, the DNS query includes the following data: an IP address of the client 105, a time stamp of the DNS inquiry, DNS query name (e.g., a domain name), and/or a DNS query type. The DNS data can be aggregated or stored in a cache of DNS 100.

Similar to above, the machines 130 can also send DNS queries to one or more DNSs 110 for further resolution. These DNS queries can be caused by an automated process of a software application, operating system or the like, and these DNS queries are not associated with a user browsing the Internet. Thus, in the environment 100, there exist two major categories of DNS queries: human-driven DNS queries and M2M DNS queries. As discussed above, the human-driven DNS queries are generated upon a user requesting to open a certain website page hosted by a web resource 125 in a web browser on the client device 105. The M2M DNS queries are all other DNS queries. Accordingly, the M2M DNS queries relate to machine-to-machine web traffic not associated with the user requesting to open a certain website page in a web browser on the machine 130. The M2M DNS queries can be associated with accessing certain services or information provided by the web resources 125. The web resources 125 can generally relate to a server for hosting website pages, storing files, providing web services, and so forth.

Still referring to FIG. 1, there is shown a classification system 120 which implements the methods for distinguishing and classifying DNS queries as described herein. The classification system 120 may be implemented on a server, a plurality of servers or provide a cloud-based domain name classification service. The classification system 120 can include hardware modules (e.g., decision-making logic, dedicated logic, programmable logic, application-specific integrated circuit (ASIC)), software modules (e.g., software run on a general-purpose computer system or a dedicated machine, microcode, computer instructions), or a combination of both. The classification system 120 is in operative communication with the ISP 115, including any devices of the ISP 115 such as one or more DNSs 110. In some embodiments, the classification system 120 can be integrated, combined or embedded into one or more ISPs 115 or into one or more DNSs 110.

The classification system 120 receives from the ISP 115 or the DNS 110 data communications including DNS data collected during processing of DNS queries received from the client devices 105 and machines 130. The DNS data can be supplied as a "live stream" from DNS 110 to the classification system 120, i.e. in real time. In alternative embodiments, the DNS data can be provided to the classification system 120 in chunks or fragments, where each fragment can include DNS queries aggregated by the DNS 110 during a predetermined period. This predetermined period can be in the range from minutes to years. For example, the DNS data can include 10-minute DNS data fragments, 1-hour DNS data fragments, 24-hour DNS data fragments, and so forth. The DNS data includes multiple DNS queries, each of which has a domain name (e.g., a core domain name, a subdomain name, or FQDN) and DNS related data (e.g., network characteristic or network address, client address, query type, time stamp, etc.).

The classification system 120 is configured to process the received DNS data by retrieving domain names and certain metric values including QC, CC, and NC for each domain name. The classification system 120 is also configured to apply one or more predetermined rules to generate or calculate a score associated with each DNS query obtained from DNS data. The score can be further used to determine, for each DNS query from the DNS data, if a particular DNS query relates to a human-driven DNS query or a M2M DNS queries. This determination can be made in terms of probability defining how likely a particular DNS query relates to one of these two categories. It should also be clear that there can be more than two categories. Once the score is calculated, it is assigned to the DNS query. Further, the DNS query with its respective score can be stored in a memory of the classification system 120. For example, the DNS query (or its corresponding domain name) with its respective score can be stored in a DNS query dictionary, which can be further used as the "ground truth" model. Moreover, the DNS query with its respective score can be also visualized or displayed to an authorized individual in any suitable manner to facilitate further analysis.

According to various embodiments of this disclosure, the score of a given DNS query can be calculated by applying one or more predetermined rules. In some embodiments, the predetermined rules cause the classification system 120 to compare the domain name of the given DNS query to records of a DNS query dictionary. The DNS query dictionary can include a first list of trusted domain names associated with various human-driven DNS queries and a second list of trusted domain names associated with various M2M DNS queries. In other embodiments, the predetermined rules cause the classification system 120 to compare the DNS query itself to records of the DNS query dictionary. For example, the DNS query dictionary can include a list of domain names with assigned Alexa® rank or Google® Page Rank, which may suggest that DNS queries with these domain names are more likely than not relate to human-driven DNS queries. In yet more embodiments, the DNS query dictionary can include previously successfully categorized DNS queries or categorized domain names.

According to other embodiments of this disclosure, the predetermined rules cause the classification system 120 to determine that the domain name of DNS query is associated with a "front-end" domain name and not with a "backend" domain name. In this disclosure, the term "front-end" domain name shall mean a domain name associated with a web resource (e.g., a server) hosting a website page that can be accessed and browsed by a user. The term "front-end" domain name shall mean a domain name associated a web resource, which does not host a website page that can be browsed by a user. If it is determined that the domain name of given DNS query is associated with the front-end domain name, the classification system 120 can generate a probability score or update an already existing probability score of the DNS query to indicate a higher probability that the DNS query is a human-driven DNS query and not a M2M DNS query.

According to yet more embodiments of this disclosure, the predetermined rules cause the classification system 120 to determine that the DNS query has a "www" prefix. It is currently common that mostly humans use such "www" prefix. Thus, once it is determined that the DNS query has the "www" prefix, the classification system 120 can generate a probability score or update an already existing probability score of the DNS query to indicate a higher probability that the domain name is a human-driven DNS query and not a M2M DNS query.

There are, however, some exceptions to this rule. For example, some hardware manufactures, like Belkin®, make devices that generate M2M DNS queries with the "www" prefix. These exceptions can be predetermined and applied to the above rule. Therefore, the classification system 120 can determine that the DNS query having the "www" prefix does not fall into one or more predetermined exceptions, and if it determined that the DNS query having the "www" prefix relates to the one or more predetermined exceptions, the classification system 120 can generate a probability score or update an already existing probability score of the DNS query to indicate a higher probability that the domain name is a M2M DNS query and not a human-driven DNS query.

According to yet more embodiments of this disclosure, the predetermined rules cause the classification system 120 to determine that the DNS query is addressed to a CDN. As discussed above, CDNs generate DNS queries that are secondary to human-driven DNS queries to facilitate accessing a copy of requested web resources, which is located geographically closer to a requesting client. For these reasons, the rule can exclude DNS queries associated with CDNs. Therefore, upon the determination that the DNS query is addressed to the CDN, the classification system 120 can generate a probability score or update an already existing probability score of the DNS query to indicate a higher probability that the domain name is a M2M DNS query and not a human-driven DNS query. The determination that a given DNS query is addressed to the CDN can include a determination that DNS query includes a "cdn" string, although other methods can be also used.

According to yet more embodiments of this disclosure, the predetermined rules cause the classification system 120 to determine that the DNS query is associated with a predetermined time pattern. If it is detected that the same or substantially similar DNS queries are generated periodically or at predetermined times, it can be inferred that these DNS queries are M2M DNS queries related to automated updates. Specifically, it can be known that certain software applications or operating systems can seek updates periodically at certain local times. In other words, any repeated DNS queries falling into this pattern can be categorized as M2M DNS queries. Thus, in some embodiments, the determination that the DNS query is associated with the predetermined time pattern can include a process of determining that there is a plurality of historical DNS queries, which are substantially the same as the DNS query, and that the plurality of historical DNS queries and the DNS query are periodically generated within a predetermined period and according to the predetermined time pattern. When it is determined by the classification system 120 that the DNS query is associated with one or more predetermined time patterns, the classification system 120 can generate a probability score or update an already existing probability score of the DNS query to indicate a higher probability that the domain name is a M2M DNS query and not a human-driven DNS query.

According to yet more embodiments of this disclosure, the predetermined rules cause the classification system 120 to rank domain names associated with given DNS queries to facilitate categorization of these DNS queries. In one example embodiment, the process of ranking can be based on receiving or obtaining a rank of domain names from a third-party provider (e.g., Alexa®) or an internal database.

In other embodiments, the rank can be calculated by the classification system 120 based on domain name metric values, which include at least one of QC, CC, and NC. When these metric values are obtained, they can be combined into a single metric, which is referred herein to as a rank. The rank can be a numerical representation and be calculated based on the following equation:

$$\text{Rank} = NC \cdot CC \cdot (1 + \log(QC)) \quad \text{(Eq. 1)}$$

Those skilled in the art will appreciate that other equations can also be used for calculating the rank. Moreover, in certain embodiments, the metric values or the rank can be used for filtering the DNS data. For example, those FQDNs that are associated with QC=1 and CC=1 can be presented by their core domain only in the DNS data or optionally removed from the DNS data. Thus, in certain embodiments, the classification system 120 filters all domain names that have QC=1 and CC=1, but processes those domain names that have QC>1 or CC>1.

In certain embodiments, the classification system 120 can filter, exclude or remove DNS queries for the domain names, which are associated with malware, fraud, phishing attacks, or any other malicious or even suspicious activity. For example, DNS queries for domain names associated with Pseudo Random Subdomain Attack (PRSD) domain names associated with Domain Generation Algorithm (DGA) are removed from a set of domain names. In other embodiments, the classification system 120 can filter, exclude or remove DNS queries for domain names that have invalid or unreadable characters. For example, any non-Latin character characters can be excluded. Or any character not in the character class {a-zA-z0-9_-.}. In yet more embodiments, the classification system 120 can filter, exclude or remove DNS queries for domain names, which are associated with a predetermined IP standard, such as IP version 4 (IPv4). Moreover, in some embodiments, the classification system 120 can filter, exclude or remove DNS queries for domain names, which are associated with a predetermined domain name type such as Address and Routing Parameter Area (ARPA) related domain names (e.g., "in-addr.arpa," "ip6.arpa," and the like).

When there are one or more subdomain names present in the DNS data for a particular domain name, a rank of the domain name can be calculated as a sum of scores calculated for the respective subdomain names. In other embodiments, the rank of the domain name can be calculated as an average or median of ranks calculated for the respective subdomain names.

In certain embodiments, when the classification system 120 calculates the rank for a DNS query, the rank can be optionally converted or normalized. For example, the rank can be converted to a percentile rank (between 0 and 1) using any suitable percentile rank equation. The normalization of ranks can be required for reducing memory space needed for storing this information. Moreover, the normalization can remove the variation caused by changes in DNS data and simplify the process of setting thresholds and cut-off values in further data analysis.

According to some embodiments of this disclosure, once the probability score of DNS query is generated, the classification system 120 can assign the score to the DNS query. In some embodiments, the classification system 120 can assign one of at least two categories to the DNS query based on the score, where the categories include a category of a human-driven DNS query and a category of a M2M DNS query. Moreover, once the probability score of DNS query is generated, the classification system 120 can store the domain name with its associated score (or category) in the DNS query dictionary.

According to some embodiments of this disclosure, the classification system 120 can train a machine-learning classifier based on the DNS query dictionary. Further, when the machine-learning classifier is trained, the classification system 120 can propagate it or apply it to generate probability scores for domain names of new DNS queries.

According to yet more embodiments of this disclosure, the classification system 120 can determine that the DNS query is associated with a malicious activity before or after their probability scores are calculated or generated. In some example embodiments, the DNS queries associated with one or more malicious activities are excluded by the classification system 120 from the DNS query dictionary.

According to certain embodiments of this disclosure, the classification system 120 can determine that the DNS query is associated with the malicious activity based on obtaining historical DNS data associated with the same or substantially same DNS query, calculating a QC for the DNS query, determining that the QC is higher than a predetermined threshold value, determining that the domain name of the DNS query does not have a predetermined rank (e.g., Alexa® rank), and associating the DNS query with a malicious activity.

Figure 2:
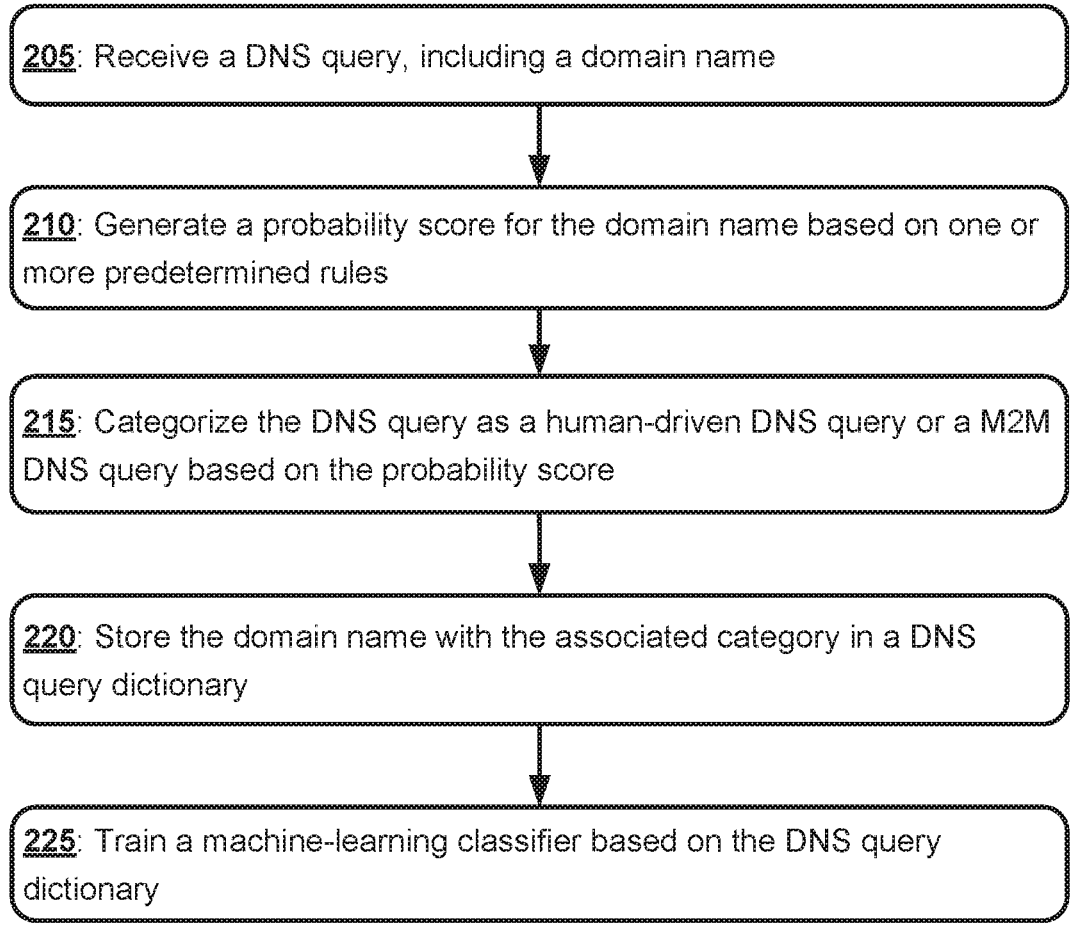
FIG. 2 is a flow chart of an example method for distinguishing and classifying DNS queries names.

FIG. 2 is a flow chart of an example method 200 for classifying DNS queries, according to some embodiments. The method 200 for classifying DNS queries may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of the classification system 120 described above with reference to FIG. 1. Notably, the steps recited below may be implemented in an order different than described and shown in the figure. Moreover, the method 200 may have additional steps not shown herein, but which can be evident for those skilled in the art from the present disclosure. The method 200 may also have fewer steps than outlined below and shown in FIG. 2.

At operation 205, the classification system 120 receives a DNS query from DNS 110 or any other source. The DNS query includes a domain name associated with a web resource that a user or machine is attempting to access. At operation 210, the classification system 120 generates a probability score for the domain name of the DNS query based on one or more predetermined rules that are described above. At operation 215, the classification system 120 categorizes the DNS query as a human-driven DNS query or a M2M DNS query based on the probability score. At operation 220, the classification system 120 can optionally store the domain name (or the DNS query) with its associated category in a DNS query dictionary. The DNS query dictionary can be stored in a memory of the classification system 120. At operation 225, the classification system 120 can optionally train a machine-learning classifier based on the DNS query dictionary so that the classification system 120 can apply it later to classify new DNS queries as human-driven DNS query or M2M DNS query.

Figure 3:
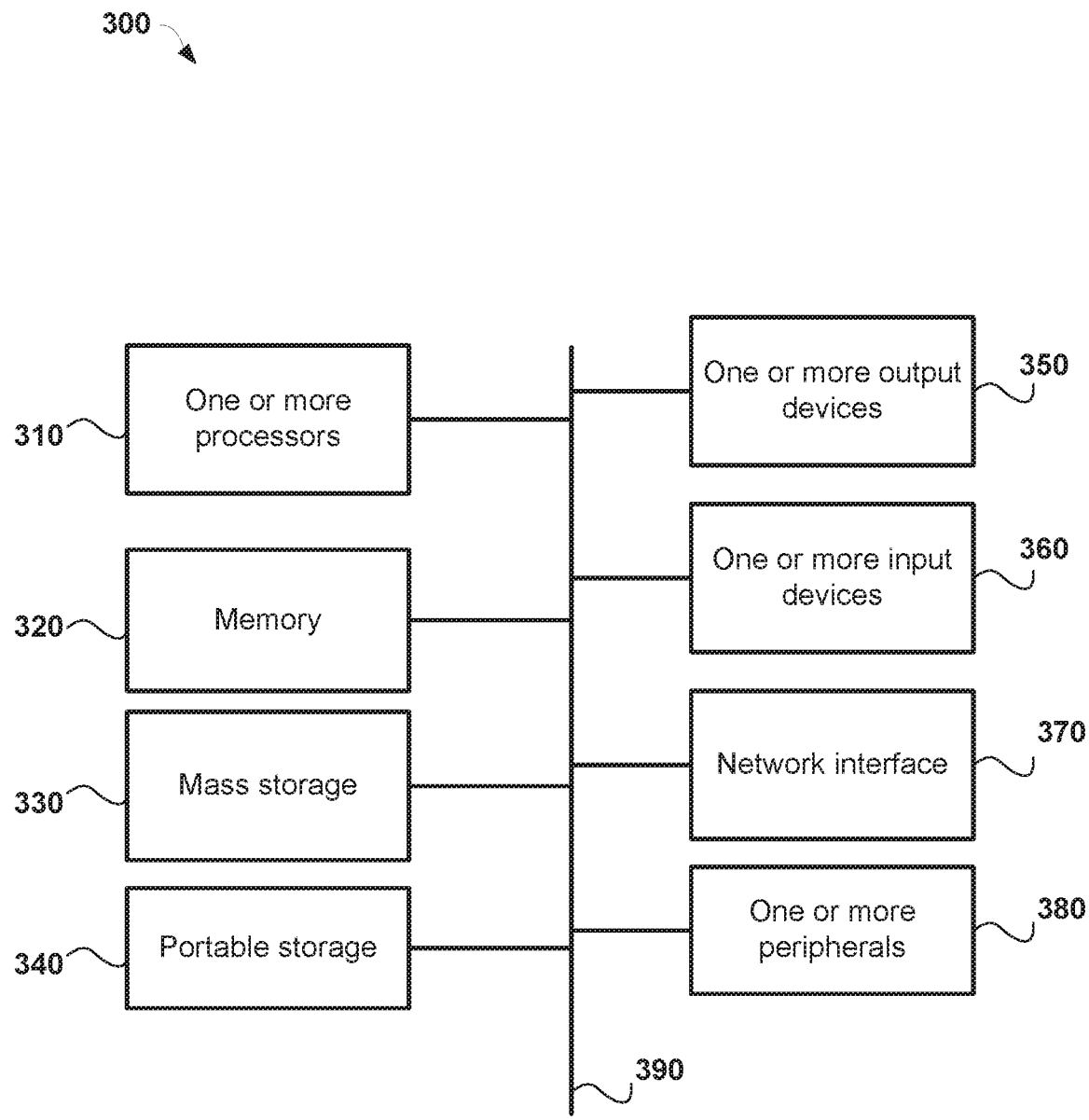
FIG. 3 is a computer system that may be used to implement methods for distinguishing and classifying DNS queries.

FIG. 3 illustrates an exemplary computing system 300 that may be used to implement embodiments described herein. The system 300 may be implemented in the contexts of the likes of client device 105, the DNS server 110, the classification system 120, web resource 125, and machine 130. The computing system 300 may include one or more processors 310 and memory 320. Memory 320 stores, in part, instructions and data for execution by processor 510. Memory 320 can store the executable code when the system 300 is in operation. The system 300 may further include a mass storage device 330, portable storage medium drive(s) 340, one or more output devices 350, one or more input devices 360, a network interface 370, and one or more peripheral devices 380.

The components shown in FIG. 3 are depicted as being connected via a single bus 390. The components may be connected through one or more data transport means. Processor 310 and memory 320 may be connected via a local microprocessor bus, and the mass storage device 330, peripheral device(s) 380, portable storage device 340, and network interface 370 may be connected via one or more input/output (I/O) buses.

Mass storage device 330, which may be implemented with a magnetic disk drive or an optical disk drive, is a non-volatile storage device for storing data and instructions for use by a magnetic disk or an optical disk drive, which in turn may be used by processor 310. Mass storage device 330 can store the system software for implementing embodiments described herein for purposes of loading that software into memory 320.

Portable storage medium drive(s) 340 operates in conjunction with a portable non-volatile storage medium, such as a compact disk (CD) or digital video disc (DVD), to input and output data and code to and from the computer system 300. The system software for implementing embodiments described herein may be stored on such a portable medium and input to the computer system 300 via the portable storage medium drive(s) 340.

Input devices 360 provide a portion of a user interface. Input devices 360 may include an alphanumeric keypad, such as a keyboard, for inputting alphanumeric and other information, or a pointing device, such as a mouse, a trackball, a stylus, or cursor direction keys. Additionally, the system 300 as shown in FIG. 3 includes output devices 350. Suitable output devices include speakers, printers, network interfaces, and monitors.

Network interface 370 can be utilized to communicate with external devices, external computing devices, servers, and networked systems via one or more communications networks such as one or more wired, wireless, or optical networks including, for example, the Internet, intranet, local area network (LAN), wide area network (WAN), cellular phone networks (e.g. Global System for Mobile (GSM) communications network, packet switching communications network, circuit-switching communications network), Bluetooth radio, and an IEEE 802.11-based radio frequency network, among others. Network interface 370 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a Universal Serial Bus (USB).

Peripheral device(s) 380 may include any computer support device to add additional functionality to the computer system. Peripheral device(s) 380 may include a modem or a router. Peripheral device(s) 380 may also include input and output devices.

The components contained in the computer system 300 are those typically found in computer systems that may be suitable for use with embodiments described herein and are intended to represent a broad category of such computer components that are well known in the art. Thus, the computer system 300 can be a personal computer (PC), handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a Central Processing Unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, methods and systems for distinguishing and categorizing DNS queries have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A non-transitory processor-readable medium having instructions stored thereon, which when executed by one or more processors, cause the one or more processors to implement a method, comprising:
    receiving a Domain Name System (DNS) query, wherein the DNS query includes a domain name;
    applying one or more predetermined rules to the domain name, the outcome of each of the one or more predetermined rules affecting a probability generated by the one or more processors to determine whether to categorize the DNS query as a human-driven DNS query and not a Machine-to-Machine (M2M) DNS query; and,
    based on the application of the one or more predetermined rules and the generated probability, categorizing the DNS query as a human-driven DNS query and not a Machine-to-Machine (M2M) DNS query.

2. The non-transitory processor-readable medium of claim 1, wherein the one or more predetermined rules include comparing the domain name to records of a DNS query dictionary.

3. The non-transitory processor-readable medium of claim 1, wherein the one or more predetermined rules include determining that the domain name is associated with a front-end domain name and not with a backend domain name.

4. The non-transitory processor-readable medium of claim 1, wherein the one or more predetermined rules include determining that the domain name has a "www" prefix.

5. The non-transitory processor-readable medium of claim 1, wherein the one or more predetermined rules include determining that the DNS query is addressed to a Content Delivery Network (CDN).

6. The non-transitory processor-readable medium of claim 1, wherein the one or more predetermined rules include ranking the domain name associated with the DNS query.

7. A computer-implemented system for processing (Domain Name System) DNS queries, the computer-implemented system comprising at least one processor and at least one memory storing processor-executable codes, wherein the at least one processor is configured to:
    receive a DNS query, wherein the DNS query includes a domain name;
    applying one or more predetermined rules to the domain name, the outcome of each of the one or more predetermined rules affecting a probability generated by the computer-implemented system to determine whether to categorize the DNS query as a human-driven DNS query and not a M2M DNS query; and
    based on the application of the one or more predetermined rules and the generated probability, categorize the DNS query as a human-driven DNS query and not a M2M DNS query.

8. A non-transitory processor-readable medium having instructions stored thereon, which when executed by one or more processors, cause the one or more processors to implement a method, comprising:
    receiving a (Domain Name System) DNS query, wherein the DNS query includes a domain name;
    applying one or more predetermined rules to the domain name, the outcome of each of the one or more predetermined rules affecting a probability generated by the one or more processors to determine whether to categorize the DNS query as a machine-to-machine (M2M) DNS query and not a human-driven DNS query; and
    based on the application of the one or more predetermined rules and the generated probability, categorizing the DNS query as a M2M DNS query and not a human-driven DNS query.

* * * * *